United States Patent Office 3,532,752
Patented Oct. 6, 1970

3,532,752
1-ALKYLIDENE-3-INDENYL
ALIPHATIC AMINES
Tsung-Ying Shen, Westfield, N.J., assignor to Merck & Co., Inc., Rahway, N.J., a corporation of New Jersey
No Drawing. Filed Dec. 30, 1965, Ser. No. 517,841
Int. Cl. A61k 27/00; C07c 87/28
U.S. Cl. 260—570.8                 6 Claims

ABSTRACT OF THE DISCLOSURE

A class of 1-alkylidenylindenyl-3-aliphatic amines, useful as anti-inflammatory and anti-pyretic agents, consisting of indenyl-3-methyl, ethyl or propylamines, which can be substituted on the nitrogen or in the side chain or on the indene ring with a variety of substituents but which must carry an alkylidenyl residue (with or without further substitution) at the 1-position. They are prepared by condensation of the appropriate aldehyde with a 1-unsubstituted indenyl alkyl amine or by the rearrangement of a 1-alkylidenyl-3-indenyl alkanoic amide.

---

This invention relates to new chemical compounds. More particularly, it relates to a new class of compounds of the indene series. Still more particularly, it is concerned with new 3-indenyl aliphatic amines having an alkylidene group, including methylidene and substtuted methylidene radicals such as arylidene and aralkylidene, on the 1-position of the fused ring system. The invention also includes the acid salts of these novel amines, novel intermediates for their preparation and new methods of synthesis.

The new 1-alkylidene-3-indenyl aliphatic amines of the invention have the general formula:

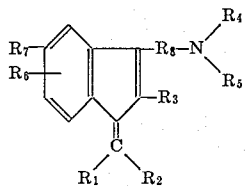

wherein:

$R_1$ and $R_2$, which may be the same or different, are each hydrogen or an alkyl, aryl or aralkyl radical, preferably lower alkyl, aryl or ar-lower alkyl containing functional substituents such as hydroxy halo, lower alkylthio, lower alkyl, trifluoromethy, lower alkylsulfamyl, lower alkoxy, di(lower alkyl)sulfamyl, nitro, phenyl and the like;

$R_3$ is hydrogen, halogen, hydroxy or a lower alkyl, aryl, ar-lower alkyl, lower alkoxy, halo lower alkyl, lower alkylthio, arylthio, lower alkenyl or lower alkoxyphenyl radical;

$R_4$ and $R_5$, which may be the same or different, are each hydrogen, lower alkyl, halo lower alkyl, lower alkoxy lower alkyl, hydroxy lower alkyl, lower alkenyl, lower alkynyl, cyclopropyl lower alkyl, tetrahydrofurfuryl, cyclic lower alkyl, or together with the nitrogen to which they are attached, morpholino, piperidino, piperazino, substituted piperazino such as N-phenylpiperazino, N-hydroxyethylpiperazino and N-methylpiperazino, pyrrolidino and 1,2,5,6-tetrahydropyridino radicals;

$R_6$ is hydrogen, halogen, lower alkyl, lower alkoxy, alkylthio, aryl, aryloxy or trifluoromethyl and together with $R_7$ when they are ortho to each other lower alkylenedioxy;

$R_7$ is hydrogen, hydroxy, lower alkyl, lower alkoxy, nitro, amino, lower alkylamio, di(lower alkyl)amino, lower alkanoylamino, lower alkanoyl, bis(hydroxy lower alkyl)amino, 1-pyrrolidino, 4-methyl-1-piperazinyl, 4-morpholinyl, alkylsulfonyl, cyano, trifluoromethyl halogen, di(lower alkyl)sulfamyl, benzylthio, benzyloxy, lower alkylbenzyloxy, lower alkoxybenzyloxy, halogenobenzyloxy, lower alkenyl, lower alkenyloxy, 1-azacyclopropyl, cyclopropyl lowered alkoxy, cyclobutyl lower alkoxy and together with $R_6$ when they are ortho to each other, lower alkylenedioxy;

$R_8$ is one of the following groups:

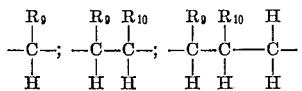

in which $R_9$ and $R_{10}$, which may be the same or different, are each hydrogen, lower alkyl, halo lower alkyl, benzyloxy lower alkyl, hydroxy lower alkyl, lower alkenyl, phenyl or lower alkynyl.

In the preferred compounds of the invention, $R_8$ is ethylene, $R_3$ is lower alkyl such as methyl or ethyl, $R_4$ and $R_5$ are each hydrogen, $R_6$ is hydrogen or lower alkoxy, $R_7$ is lower alkyl, lower alkoxy, di(lower alkyl)amino or trifluoromethyl and the alkylidene group at the 1-position is a p-substituted benzylidene radical.

It has been found that when a 3-indenyl lower aliphatic amine is substituted at the 1-position with a alkylidene or substituted alkylidene radical, these compounds possess a high degree of anti-inflammatory activity, also exhibiting anti-pyretic action, and thus are of value in the management of arthritic and dermatological disorders and like conditions responsive to treatment with anti-inflammatory agents. For these purposes, the compounds are normally administered orally in tablets or capsules, the optimum dosage depending upon the particular compound used and the type and severity of infection being treated. Although the optimum quantities of these compounds to be used will depend on the substance selected and the particular type of disease condition treated, oral dose levels in the range of 10–2000 mg. per day are useful in the control of arthritic conditions, depending on the activity of the specific compound and the reaction sensitivity of the subject being treated.

The following compounds are representative of those contemplated by this invention. These and others may be prepared by the procedures discussed herein below:

β-[1-(p-chlorobenzylidenyl)-2-methyl-5-methoxy-3-indenyl]ethylamine;

α-[-(N-methylpiperandinylidenyl-4)-2-isopropyl-5-azacyclopropyl-6-fluoro-3-indenyl]-N-methyl-aminopropane;

α-[1-(6-quinolinylidenyl)-2-cyclobutyl-4-methoxy-5-diethylsulfamyl-3-indenyl]-β-chloromethyl-propylamine;

β-[1-methyl-butyl-methylidenyl-2-vinyl-5-(1'-pyrrolidino)-7-phenyl-3-indenyl]-α-(2-bromoethyl)-N,N-diisobutylaminobutane;

β-(1-methylfurylmethylidenyl-2-benzylthio-5-trifluoromethyl-6-ethylthio-3-indenyl)-α-hydroxymethyl pentylamine;

γ-[1-(2-phenylcyclopentylidenyl)-2-fluoro-4-phenoxy 5-cyclobutyl-ethoxy-3-indenyl-β-ethynyl-N,N-dicyclopropylmethyl)aminohexane;

γ-[1-(benzofurylidenyl-5)-2-chloromethyl-5-acetyl-amino-3-indenyl]-N-allylaminopropane.

The compounds of this invention are 1-alkylidene-3-indenyl aliphatic amines. A preferred method for preparing these compounds, with a desired-1-substituent on the indene nucleus, involves the reaction of an indenyl aliphatic amine with a carbonyl compound, preferably with at least one functional substituent. The term "functional substituent" refers to a group other than hydrogen or alkyl, whose polarity and general character affects the electron distribution of the group, causing activation and/or inactivation in some positions of that group.

The novel reaction which condenses the indene aliphatic amines and the carbonyl compounds involves the methylene radical at the 1-position of the indene nucleus and the carbonyl group of an aldehyde or ketone. Only the methylene group of the indene so reacts because of the two active, available hydrogen ions in the radical. The condensation is preferably accomplished with a base catalyst, with aldehydes usually more reactive in the process than ketones, i.e., the former produce a higher yield of the condensed product.

Some of the aromatic homocyclic and heterocyclic aldehydes which may be used are benzaldehyde and substituted benzaldehydes such as 4-chlorobenzaldehyde, 2-chlorobenzaldehyde, 4-bromobenzaldehyde, 2,4-di-chloro or dibromobenzaldehyde, 4-methylthiobenzaldehyde- 4-methyl, ethyl, propyl, i-propyl, butyl or t-butyl-benzaldehyde, 4-fluoro-benzaldehyde, 4-trifluoromethyl-benzaldehyde, 3 - trifluoro-methylbenzaldehyde, 4 - dimethylsulfamylbenzaldehyde, 4 - methylsulfamylbenzaldehyde, 2-nitro-4-chlorobenzaldehyde, 2-methoxy-4-dichlorobenzaldehyde, 2-nitro - 4 - methylbenzaldehyde, 2-nitro - 4-fluorobenzaldehyde, 2-nitro-4-methoxybenzaldehyde, p-anisaldehyde, salicylaldehyde, vanillin, p-terephthalaldehydic acid amines (e.g., the methyl, dimethyl, methyl ethyl and diethylamides), pyridine 2,3 and 4-aldehydes, thiophene 2 or 3-aldehydes, prazine aldehyde, pyrrol-2-aldehyde, furfural, pyrimidine-2-aldehyde, α and β-naphthaldehyde, benzothiazole-2-aldehyde, 3-nitrothiophene-2-aldehyde, furyl-2-aldehyde, 1 - methylpyrrol-2-aldehyde, thiazole-4-aldehyde, thiazole-2-aldehyde, 1-methylpyrazole-5-aldehyde, oxazole-4-aldehyde, 5-styryl-6 - ethoxyoxazole-2-aldehyde, 1 - methylpyridine-4-aldehyde, 2-ethoxypyrane-3-aldehyde, 1-phenylpridazine-6-aldehyde, 1 - methylindole - 3 - aldehyde, 5-chlorobenzofuran-3-aldehyde, thionaphthene-3-aldehyde, benzofuran-5-aldehyde, 1-methylbenzimidazole-2-aldehyde, 7-azaindole-3-aldehyde, quinoline-8-aldehyde, isoquinoline-4-aldehyde, quinoxaline-2-aldehyde, naphthpyridine-2-aldehyde, benzoxazole-2-aldehyde and the like. Substituents on the aromatic rings are preferably in the 4-position.

Some of the aliphatic aldehydes are lower alkyl aldehydes such as formaldehyde, acetaldehyde, valeraldehyde, cyclopentylaldehyde, heptaldehyde, 5-methylhexanal, ethylbutylacetaldehyde, nononal, 7-methyloctanal, methylisopropylacetaldehyde, caproic aldehyde, cyclohexylacetaldehyde, ethylisobutylacetaldehyde, methylhexylacetaldehyde, 4-hydroxy butanal, 4-hydroxy cyclohexylaldehyde, methacrolein, 2-methyl-2-butenal, 2-methyl-2,3-dichloropental, β,β,β, - trifluoropropionaldehyde, α-bromoisobutyraldehyde, α-methyl-α-methoxy butaldehyde, $\Delta^3$-cyclohexenylaldehyde, 4 - oxocyclohexylaldehyde and 4-dimethylaminocyclohexyaldehyde.

Representative of the aliphatic and aromatic ketones are acetone, methyl ethyl ketone, methyl isoamyl ketone, 4-methyl-2-hexanone, propyl isopropyl ketone, dibutyl keone, methyl cyclopropyl ketone, methyl cyclohexyl ketone, methyl 4 - hydroxycyclohexyl ketone, 3,3-dimethyl - 1 - cyclopentanone, α-methyl-α-cyclopentylacetone, acetophenone, methyl benzyl ketone, phenyl isopropyl, ketone, 2 - phenylcyclopentanone, methyl α-naphthyl ketone, benzophenone, p-isopropylbenzophenone, 3-thiophenone, 2 - acetylfuran, ethyl 2-furyl ketone, 2-acetyl-5-methyl thiophene, 1-(α-tetrahydrofuryl)-3-butanone, 3-pyradylacetone, methyl-2-benzofuryl ketone, 3-methyl-benzopyone, 2 - benzoylfuran, 3-acetylquinoline and 2-phenacylpyridine.

On the 2-position of the indene nucleus a number of groups may be substituted, as indicated heretofore, or the position may be unsubstituted, in which case $R_3$ is hydrogen.

Since the compounds of the invention are 3-indenyl aliphatic amines, the 3-position has an alkyl group terminating in an amino or substituted amino group. The alkyl group may be a methylene, ethylene or propylene radical or homologue thereof, except that, as is shown in the formula for the propylene group given heretofore and by the description for the preparation of that group given hereinafter, the α-carbon, which is next to the nitrogen of the amino group, always has the two available bonds of its valence completed by hydrogen ions.

The benzenoid ring of the indene nucleus may be substituted at any of the available positions (i.e., having a replaceable hydrogen). Most often, the 5-position is so substituted, but one or more additional substituents, as defined by $R_6$ may be at the 4,6 and 7 carbons of the indene nucleus.

Flow Sheet I illustrates the preparation of the starting compounds used in the process of the invention, using α-methyl-α-(4-methylphenyl) propionic acid as the desired product.

FLOW SHEET I

Preparation of α-methyl-β-(4-methylphenyl) propionic acid

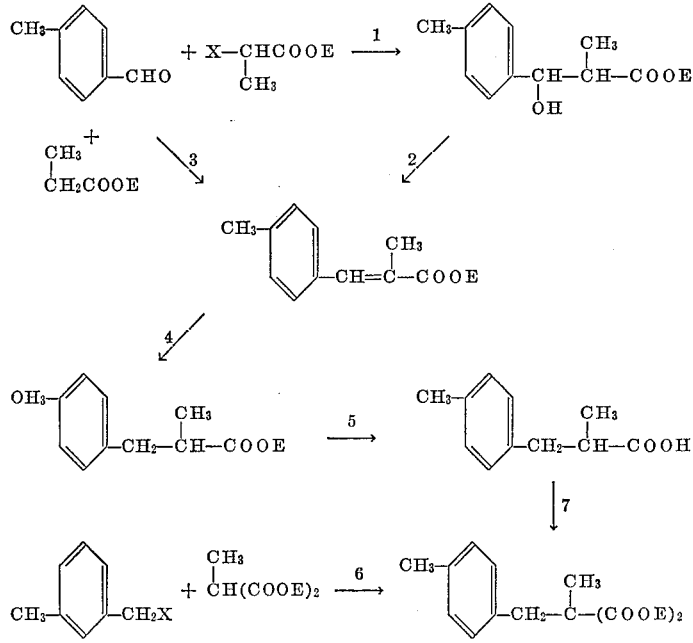

X = a halogen, usually bromine or chlorine
E = an esterifying group, usually methyl, ethyl or benzyl.

Reagents (1) Zn dust in anhydrous inert solvent such as benzene and ether
(2) KHSO₄ or p-toluene sulfonic acid
(3) NaOC₂H₅ in anhydrous ethanol at room temperature
(4) H₂, palladium on charcoal, 40 p.s.i. room temperature
(5) NaOH in aqueous alcohol at 20–100°
(6) NaOC₂H₅ or any other strong base such as NAOH or K-t-butoxide
(7) Acid As the flow sheet indicates, several methods of preparation for the acid starting material can be used. Thus a substituted benzaldehyde may be condensed with a substituted alkanoic ester in a Claisen reaction or with an α-halo propionic ester or homologue thereof in a Reformatsky reaction. The resulting unstaturated ester is reduced and hydrolyzed to produce the phenyl propionic acid starting material. Alternatively, a substituted malonic ester in a typical malonic ester synthesis and acid hydrolysis of the resulting substituted ester yields the benzyl propionic acid directly. This latter method is especially preferable for nitro and alkylthio substituents on the benzene ring.

In the presently preferred process, ring closure is effected by dehydrating a β-aryl propionic acid, reducing the resulting compound, reacting that reduced compound with a halosulfinate ester and heating to form an indene, then treating with a 1-nitroalk-1-ene in a Michael reaction to form a nitroalkane substituted indene which is then reduced to an indenyl ethylamine. The latter is condensed with a carbonyl compound to form a 1-alkylidene-3-indenyl imine which is hydrolyzed to the desired amine. Flow Sheet II shows the production of β-(1-benzylidenyl-2-methyl-3-indenyl) ethylamine, and is illustrative of this synthesis.

FLOW SHEET II

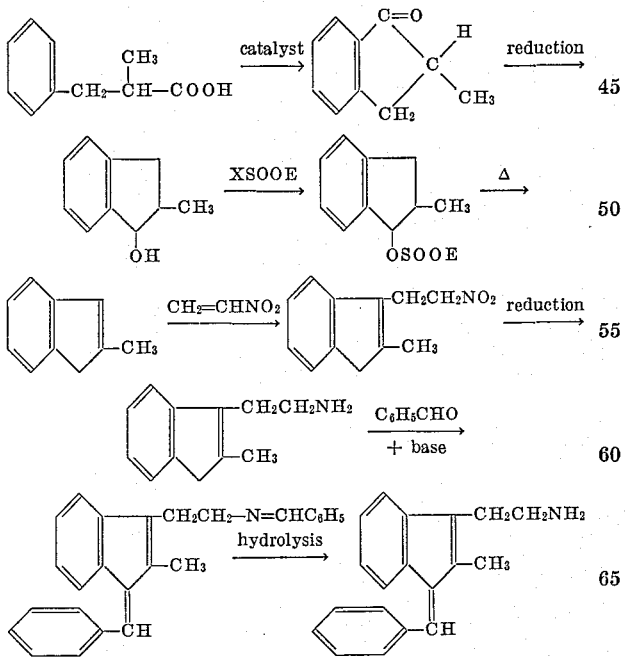

However, the compounds of the invention also include substitutents at the 3-position where the alkylene component is either methylene, propylene or a homologue of either. When the propyl is desired at the 3-position, the 3-indenyl nitroethane synthesized above is converted to the corresponding carbonyl compound, reduced to an alcohol, converted to a nitrile via an intermediate ester or halide and reduced to an indenyl propylamine. The condensation reaction at the 1-position is then performed as shown above. Starting with β-(2-methyl-5-methoxy-3-indenyl) nitroethane, the method of preparation of β-[1-(p-chlorobenzylidenyl) - 2 - methyl-5-methoxy-3-indenyl] propylamine is illustrative of this synthesis and is shown in Flow Sheet III (X=Cl, Br or an aryl sulfonic radical),

FLOW SHEET III

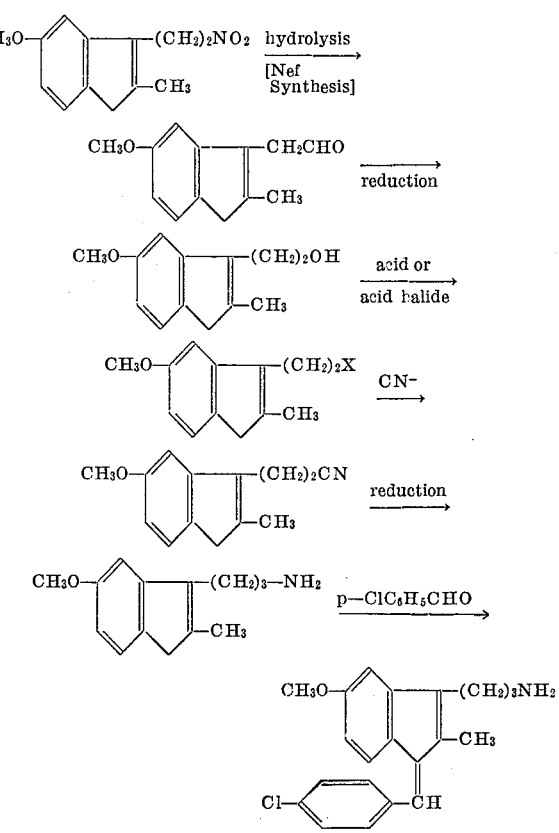

The third class of indenyl aliphatic amines of the invention has a methylene or substituted methylene radical at the 3-position. The synthesis of this compound commences with an indanone produced by the ring closure reaction described heretofore. An α-halo alkanoic ester is condensed with that indanone to produce an α-hydroxy-α-(3-indenyl) methyl ester which is dehydrated in the presence of an acid. The selected alkylidene group is then condensed on the 1-position and the ester protecting group is removed by hydrolysis. The resulting acid is converted to an amide and then the latter is subjected to a Hofmann degradation to yield the desired end product. Flow Sheet IV shows this reaction sequence in the preparation of α-[1 - (p - methoxybenzylidenyl)-2-methyl-5-fluoro - 3 - indenyl] ethylamine.

FLOW SHEET IV

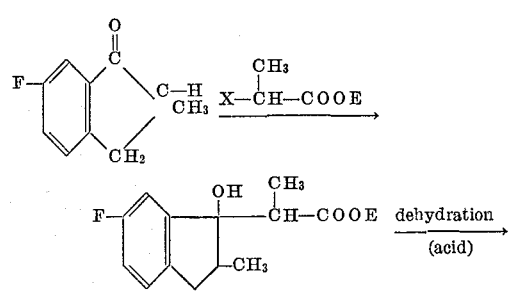

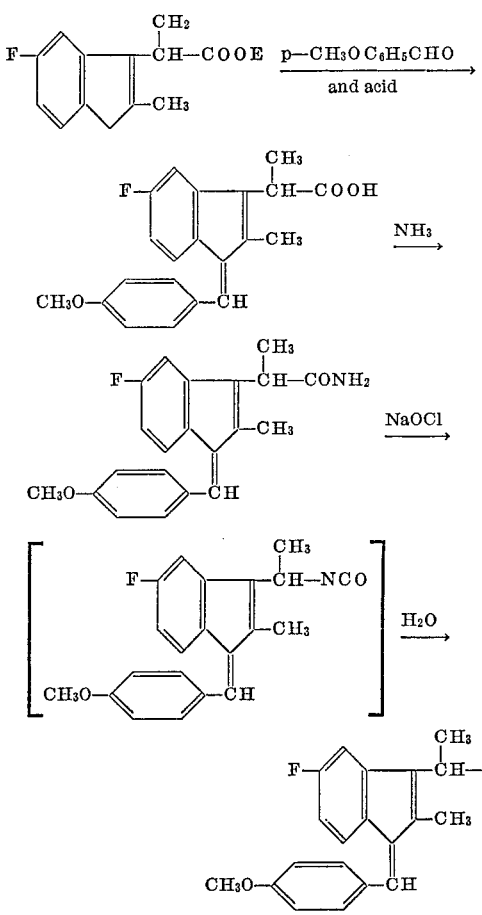

The ring closure of the propionic acid starting material used in the preparation of the compounds of this invention is essentially a dehydration and may be accomplished in any manner which will extract water and produce an indanone. In a preferred method polyphosphoric acid is used as an acid catalyst for this purpose, at temperatures from about 70° C. to about 100° C., for from about one-half to about four hours. Alternately, a Lewis acid catalyst can be used. The product is isolated in any convenient manner, for example, by extraction and evaporation of the solvent.

In order to produce an end product with 3-ethylene and 3-propylene chains, this carbonyl compound is reduced to the corresponding indanol by any suitable reduction procedure. In a preferred method a carbonyl reducing agent, suitably sodium borohydride is used for the reaction. The reduction is accomplished at temperatures from about 15° C. to about 100° C., during a period from about four to about eight hours, in a lower alkanol solvent, such as methyl or propyl alcohol. It is most convenient to reflux the mixture at the boiling point of the alkanol selected.

This crude indanol is then dehydrated to the corresponding indene by a process which does not disturb the basic carbon skeleton of the molecule. In a preferred method, the indanol is reacted with a reagent to form a compound which can be decomposed to produce the desired indene. Thus, reaction of a halo-sulfinate, such as methyl chlorosulfinate, at temperatures from about −10° C. to about +15° C. for a period from about one-half to about two hours, yields the intermediate sulfinite. This latter is isolated, preferably by extracting with a low boiling solvent, suitably an ether, which can be easily evaporated. Pyrolysis in an inert atmosphere, suitably nitrogen, and concomitant distillation between 100° C. and 350° C. under partial vacuum yields a relatively pure indene.

In the next step the indene compound is condensed with nitroethylene or a nitroethylene derivative such as 1-nitro-1-methylbutene-1 to produce the aliphatic side chain on the indene nucleus. This reaction is preferably performed in the presence of a base, such as a tertiary alkoxide, as a catalyst, in a reaction inert solvent such as dimethoxyethane or an ether, suitably dioxane or tetrahydrofuran, at temperatures from about 0° C. to about 30° C., for a period from about one to about eight hours. A slight excess of the alkene will insure as complete a reaction as possible. The product may be isolated in any convenient manner, such as solvent extraction and evaporation, chromatography, etc.

It is to be noted that the reaction of the nitroethylene compound and the indene can occur at either the 1- or the 3-position of the indene nucleus, since both carbons possess an active hydrogen. When the indene has a substituent on the benzenoid portion of the nucleus (e.g., a methoxy group on the 6-carbon), position isomers will result from the synthesis of the compounds of the invention. This is illustrated most clearly by the following formulae:

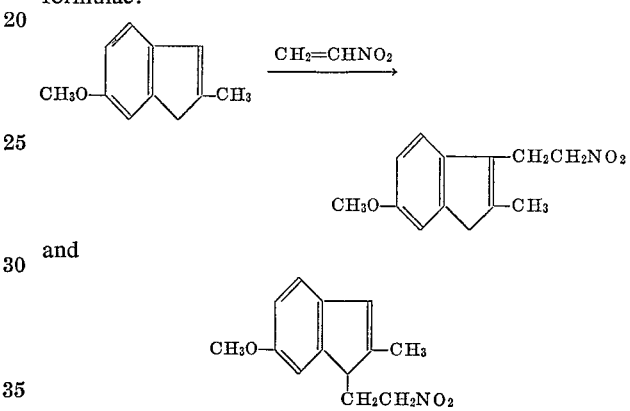

and

Both of the products will react with the carbonyl reagent (after they are reduced) in the condensation reaction delineated hereafter to produce the 1-alkylidene substituent. Hence the product will be a combination of the 5-and-6-methoxy isomers of the compounds of the invention. They may be separated and isolated by chromatography or any other technique which lends itself to the resolution of isomers of this type. In the interests of simplicity, we have only shown one isomer as the product of the reactions involving compounds with substituents on the benzene portion of the indene nucleus, in the examples given hereinafter. Thus when a 4-fluoro compound of the invention is synthesized, the isomeric 7-fluoro material also produced is not shown. Of course, in the special case where there is no substituent on the benzenoid ring, only one product is produced.

After the nitroalkyl chain has been elaborated at the 3-position of the indene, the next step depends upon the desired end product. If the latter has an ethylene group on the 3-position, then the nitro compound prepared above is reduced to the corresponding amine, preferably by hydrogenation. The reaction is preferably performed in a lower alkanol solvent such as methanol or butanol, in the presence of a noble metal catalyst such as palladium or platinum. Palladium on an inert support such as charcoal is preferred. The reaction is carried out at temperatures of from about 20° C. to about 40° C. and is continued until the calculated amount of hydrogen is absorbed to avoid the reduction of the indene double bond. The length of reaction time varies with the quantities of reactants involved, but for the usual laboratory and pilot procedures a time from about one-half to two hours is ordinarily sufficient.

However, if a propyl group is desired at the 3-position of the indene, the nitro compound produced above is first converted to a carbonyl compound. This is most conveniently accomplished by a Nef synthesis, first obtaining the aci compound by treatment of the nitro product with a strong base and then acidifying with mineral acid to produce the carbonyl intermediate. This synthesis may be depicted by the following schematic formulae, showing the reaction of the nitroethylene group, with R representing the indene nucleus:

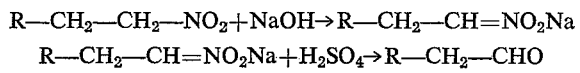

For conversion to an aci salt, the nitro compound is reacted with a base, preferably an alkali metal hydroxide or lower alkoxide, although salts of alkali metals and weak acids can also be employed. The reaction is carried out in a polar solvent, such as water, a lower alkanol or a water-alkanol mixture. The formation of the product is quite rapid and some cooling may be necessary to control the reaction. It is generally preferred to maintain th reaction temperature at from about 10° C. to about 25° C.

Hydrolysis of this primary acinitro compound to the aldehyde is accomplished with a strong acid, suitably a strong mineral acid such as sulfuric acid. In a preferred method the salt is slowly added with stirring to the mineral acid, preferably one containing from 20% to 50% acid by weight, over a period of from about one to about six hours, while the temperature is maintained from about −30° C. to about 15° C., preferably −5° C. to 15° C. The time of reaction will vary with the amount of reactants and the rate at which they are mixed at the selected reaction temperature. The product is isolated in any suitable manner, for example, by extraction with a solvent, suitably a hydrocarbon containing up to six carbon atoms, followed by removal of the solvent after washing and drying.

The product recovered from the above synthesis is then reduced to the corresponding indenyl ethanol. In a preferred method a carbonyl reducing agent, suitably sodium borohydride, is used for the reduction. The reaction is accomplished at temperatures from about 50° C. to about 120° C., during a period from about four to about eight hours, in a lower alkanol solvent such as methyl or propyl alcohol. It is most convenient to reflux the mixture at the boiling point of the alkanol selected.

The indenyl ethanol thus produced is then treated with an acid or an esterifying agent to yield a product which will react with a cyanide reagent to produce the corresponding ethyl nitrile. The preferred reagent, an aryl sulfonic halide, forms an intermediate ester. The reaction may be depicted by the following sequence, where R represents the indene nucleus and Ar is an aryl group:

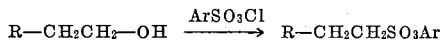

A basic medium, suitably pyridine, increases yields. The reaction takes place at about 0° C., to about 50° C., preferably 0° C. to 10° C.

This compound is then reacted with an alkali metal cyanide, preferably sodium or potassium cyanide, to produce an indenyl ethylene nitrile.

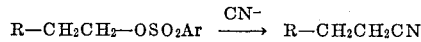

The next step, reduction of this nitrile to the corresponding propylamine, is carried out using a suitable reagent. Preferred reactants include metal hydrides such as lithium aluminum hydride, in an inert solvent such as ether; with tetrahydrofuran most suitable, and at temperatures from about 30° C. to about 50° C., for a period from about four to about eight hours.

The product of this reaction is the propyl homologue of the indenyl ethylamine synthesized previously. Thus the condensation reaction with a carbonyl compound to form a 1-alkylidene-3-indenyl aliphatic amine can be effected on either homologue.

The introduction of the alkylidene radical at the 1-position of the indenyl amine is accomplished by treatment with the selected carbonyl reagent, dissolved in a reaction inert solvent such as pyridine, dimethylformamide or an ether (ethyl ether, dioxane, tetrahydrofuran or dimethoxyethane are suitable) at room temperature, although the reaction is not adversely affected by temperatures as low as 0° C. nor as high as 100° C. The presence of a basic catalyst such as potassium tert butoxide or trimethylbenzylammonium hydroxide (the latter as a water solution) produces the necessary carbanion at the 1-position to allow the reaction to occur. A slight excess of the carbonyl reagent will help to insure as complete a reaction as possible.

As indicated heretofore, the third group of the compounds of the invention, those having a methylene group at the 3-position of the indene, are synthesized from an indanone starting material. In the first step, an alkyl radical is condensed with the indanone by means of a Reformatsky reaction. The reagent is an α-halo compound, preferably an alkanoic ester, to prevent unneeded side reactions during subsequent steps, and a non-polar reaction inert solvent, suitably benzene, serves the same purpose. The reaction mixture is heated at reflux for a period from about six to about fifteen hours to produce a β-hydroxy indenyl ester.

This intermediate is then dehydrated with a suitable reagent to eliminate the hydroxyl group and form the indene. In a preferred method, an aryl sulfonic acid-dehydrant mixture such as p-toluene sulfonic acid and calcium chloride, in a non-polar solvent, such as toluene or benzene is used. The mixture is heated between about 75° C. to about 125° C., suitably at the reflux temperature of the solvent, for a period of about 6 to about 12 hours.

This indenyl ester is then reacted with a carbonyl compound to form a 1-alkylidene derivative. This reaction is identical to the condensation reaction between the indenyl aliphatic amine and the carbonyl reagent described heretofore, except that only half as much of the aldehyde or ketone need be added, since no imine is formed here. The hydrolysis of the ester, in any suitable manner, produces a 3-indenyl-α-alkyl carboxyl acid.

The synthesis of a primary amide from this acid, in any convenient manner, and the conversion of that amide to an amine via the Hoffmann degradation reaction yields a 1-alkylidene-3-indenyl-α-alkylamine compound of the invention. The Hoffmann process, in addition to converting the amide to an amine, produces a compound having one less carbon atom than the starting material and hence is most suitable for the production of the α-alkyl compounds of this invention. However, in order to avoid excess ring halogenation, it is preferred to use sodium hypochlorite solutions for the transformations, rather than the usual bromine-sodium hydroxide reagent.

The methods of preparation of the compounds of the invention given hereinbefore are suitable for the preparation of all the substituted derivatives of such compounds. When a given substituent is desired at the 2-position, the proper α-substituted β-aryl propionic acid is selected for the indanone condensation. In the same manner, by choosing this acid with the proper substituents on the phenyl radical, the benzenoid portion of the indene nucleus is substituted with the desired groups.

However, in those cases wherein a reduction is required to prepare the starting or intermediate materials, all those groups in the molecule which are susceptible to reduction (such as alkenyls, alkynyls, benzyloxy, nitro, and cyano groups) are either eliminated or protected prior to the reduction step. In those cases where the substituent is an alkenyl or alkynyl group, the corresponding aldehyde or ketone may be used, whereupon, after reduction, the aldehyde or ketone is converted to the alkenyl or alkynyl group by means of a Wittig reaction. In those cases where the group is a benzyloxy or substituted benzyloxy, the corresponding hydroxy or substituted hydroxy may be used, whereupon, after reduction, the benzyloxy substituent may be obtained by benzylating the hydroxy group. In cases wherein the substituent is the cyano group, the carboxamide group is used in its place, whereupon, after reduction, the carboxamide is dehydrated to the desired cyano substituent. In some cases, it is also possible to reduce the particular compound by a selective reduction, which will not affect certain groups.

The synthesis of various compounds of this invention having a 5-substituent which has a nitrogen attached to the benzenoid ring of the indene is generally based on the 5-nitro compound, which is transformed into the desired 5-substituent. However, due to the reducing conditions necessary for many of the reactions described heretofore in the synthesis of the compounds of the invention, it is necessary to convert the nitro substituent to the desired radical before the propionic acid starting material is condensed to an indanone, unless the reduction of that nitro substituent to the amino radical will not be disadvantageous to further reactions at that position.

The transformation of the nitro group can be carried out in a number of ways, after reduction to the corresponding amine. Thus reaction of the amine with alkyl halides gives mono or dialkylamino groups. If the alkyl halide is a dihaloalkylene group (e.g., 1,4-dibromobutane), a heterocyclic ring (e.g., pyrrolidino) is formed. Similarly, bis-($\beta$-chloroethyl) ether will give an N-morpholino compound. Alkylation can also be carried out simultaneous with reduction, as, e.g., with formaldehyde and Raney nickel and hydrogen. Acylation can similarly be carried out on these amino compounds or on the nitro (with simultaneous reduction) to give 5-acylamido compounds. The amino group can be reacted with isocyanates to give 5-ureido compounds.

The salts of the amine compounds of the invention may be prepared in accordance with well-known procedures, as, for example, dissolving the amine in a suitable organic solvent, followed by the addition of the desired acid. For instance, gaseous hydrochloric acid may be bubbled into a solution of the amine to produce the hydrochloride salt as a precipitate. The product is filtered and washed with an organic solvent, suitably a lower alkanol, such as ethanol. It is specifically intended to include those salts which are pharmaceutically acceptable within the purview of the invention. Such salts contain a pharmaceutically acceptable anion which is a non-toxic anion of any of the simple acids used therapeutically to neutralize basic medicinal agents when salts thereof are to be utilized thereapeutically. These acids include both organic and inorganic acids as for example, in addition to hydrochloric acid mentioned above, hydrobromic, hydriodic, sulfuric, succinic, phosphoric, maleic, tartaric, citric and glycolic acids. But the pharmaceutical activity of the neutral molecule is primarily a function of the cation. The anion serves primarily to supply electrical neutrality.

When $R_4$ and $R_5$ substituents are desired other than hydrogen, the primary amino group of the compounds synthesized is reacted with the proper organic halide to yield the desired $R_4$ and $R_5$ substituent, as, e.g., when a lower alkyl is desired, the primary amino group may be reacted with a lower alkyl iodide in an inert solvent at slightly elevated temperatures; when an allyl group is desired, the primary amino group may be reacted with an allyl bromide; or when $R_4$ and $R_5$ are taken together with the nitrogen and the morpholino group is desired, the reaction may be carried out on the primary amino group using $\beta,\beta$-dichlorodiethyl ether.

This invention can be illustrated by the following non-limiting examples.

EXAMPLE 1

2-methyl-6-methoxyindanone (A) A total of 0.55 mole of zinc dust is placed in a 500 ml. 3-necked flask and a 250 ml. addition funnel attached thereto is charged with a solution containing 80 ml. of anhydrous benzene, 20 ml. of anhydrous ether, 0.58 mole of p-anisaldehyde and 0.55 mole of ethyl-2-bromopropionate. About 10 ml. of the solution is added to the zinc dust with vigorous stirring and the mixture is warmed gently until an exothermic reaction commences. The remaining reactants are added dropwise at such a rate that the reaction mixture is refluxing smoothly on its own accord (ca. 30–35 min.). After addition is completed the mixture is placed in a water bath and refluxed for 30 minutes. After cooling to 0°, 250 ml. of 10% sulfuric acid is added with vigorous stirring. The benzene layer is extracted twice with 50 ml. portions of 5% sulfuric acid and washed twice with 50 ml. portions of water. The aqueous acidic layers are combined and extracted with 2×50 ml. ether. The combined ethereal and benzene extracts are dried over sodium sulfate. Evaporation of solvent and fractionation of the residue through a 6" Vigreux column affords 89 g. (69%) of the product, ethyl-2-hydroxy-2-(p - methoxyphenyl)-1-methylpropionate, B.P. 165–160° (1.5 mm.).

By the method described in Vander Zanden, Rec. trav. chim. 68, 413 (1949), the above compound is converted to 2-methyl-6-methoxyindanone.

(B) When similar quantities of other aldehydes are employed in the procedure of Part A in place of p-anisaldehyde, the corresponding 2-methyl indanones are obtained, for example:

2,6-dimethylindanone
2-methyl-6-hydroxyindanone
2-methyl-6-cyanoindanone
2-methyl-4-methoxy-6-hydroxyindanone
2-methyl-6-methylthioindanone
2-methyl-6-benzyloxyindanone
2-methyl-6-methylsulfonylindanone
2-methyl-6-dimethylsulfamoylindanone
2-methyl-6-dimethylaminoethylindanone
2-methyl-6-(p-ethylbenzyloxy)indanone
2-methyl-6-fluoroindanone
2-methyl-6-benzylthioindanone
2-methyl-6-aminoindanone
2-methyl-6-diethylaminoindanone
2-methyl-6-(p-chlorobenzyloxy)indanone
2-methyl-5,6-methylenedioxyindanone (C) By replacing the bromopropionate compound in Part A with other halo esters, as well as using other aldehydes, indanones substituted or unsubstituted at the 2 position and on the benzenoid ring are obtained, for example:

2-isopropyl-6-methoxyindanone
2-phenyl-6-methylindanone
2-methoxy-4-methylindanone
2-methylthio-6-methylindanone
2-phenylthioindanone
2-allyl-6-methoxyindanone
2-fluoroindanone
2-chloromethyl-6-dimethylsulfamylindanone
2-methylthio-6-phenoxyindanone
2-(p-methoxyphenyl)-6-t-butylindanone
2-trifluoromethyl-6-ethoxyindanone
2-ethyl-6-(4'-methyl-1'-piperazinyl)indanone
2-(prop-2-en)-6-cyano-7-methylindanone
2-(t-butyl)-6-methoxy-7-trifluoromethylindanone
2-bromo-6-(4'-morpholinyl)-7-fluoroindanone
2-(p-methoxyphenyl)-5-chloro-6-methoxyindanone
2,7-dimethyl-6-cyclobutylmethyloxyindanone
6-vinylindanone
2-thienyl-6-methoxyindanone
2-benzylindanone (D) Additionally, many indanones are known in the literature and are thus readily available as intermediates for the rest of the synthesis. Among these compounds are:

5-methoxyindanone
6-methoxyindanone 6-methyl-2-benzylindanone
5-methylindanone
5-methyl-6-methoxyindanone
5-methyl-7-chloroindanone
4-methoxy-7-chloroindanone
4-isopropyl-2,7-dimethylindanone
5-nitroindanone
7-nitroindanone
7-phenylindanone
2-phenylindanone
6,7-benzoindanone
5,6,7-trichloroindanone
5-benzyloxyindanone
2-n-butylindanone
5-methylthioindanone
5-methoxy-7-nitroindanone

EXAMPLE 2

α-Methyl-β-(p-methylthiophenyl)propionic acid

To a solution of 2.3 (0.1 mole) of sodium in 100 ml. of absolute alcohol is added 17.4 g. (0.1 mole) of diethyl methylmalonate and 17.3 g. (0.1 mole) of p-methylthiobenzylchloride. The mixture is heated under reflux in a water bath for three hours. The reaction mixture is poured into water and the aqueous solution is extracted six times with ether and dried. It is then evaporated to yield diethyl methyl-p-methylthiobenzyl malonate. The crude product is then saponified by heating with excess 4% sodium hydroxide in aqueous ethanolic solution. The solution thus formed is concentrated, extracted with ether to remove any neutral material, and acidified with dilute sulfuric acid. The acidic mixture is heated on a steam bath for one hour, cooled and then extracted with ether. Evaporation of the ether solution gives α-methyl-β-(p-methylthiophenyl) propionic acid.

In a similar manner, using other substituted malonic esters in place of diethyl methylmalonate and other substituted benzyl halides in place of p-methyl-thiobenzyl chloride, the corresponding substituted propionic acids are obtained, for example:

α-allyl-β-(p-nitrophenyl) propionic acid
α-methoxyphenyl-β-(p-ethylthiophenyl) propionic acid
α-methyl-β-(p-methoxyphenyl) propionic acid

EXAMPLE 3

2-methyl-6-methoxyindanone

α-Methyl-β-(p-methoxyphenyl) propionic acid (15 g.) is added to 170 g. of polyphosphoric acid at 50° and the mixture is heated at 83–90° for two hours. The syrup is poured into iced water, stirred for one-half hour and then extracted with ether three times. The ethanol solution is washed with water twice and 5% NaHCO₃ five times until all the acidic material has been removed. The remaining neutral solution is washed with water and dried over sodium sulfate. Evaporation of the solution gives 2-methyl-6-methoxyindanone.

In a similar manner, other β-aryl propionic acids may be converted to the corresponding indanone by the procedures of this example. Thus, α-methyl-β-[(3-chloro-4-ethoxy) phenyl] propionic acid, α-fluoro-β-(p-isopropoxyphenyl) propionic acid, α-isopropyl-β-(p-benzyloxyphenyl) propionic acid and α-(prop-2-en)-β-[(2-methyl-4-phenoxy)-phenyl-propionic acid yield 2-methyl-5-chloro-6-ethoxyindanone, 2-fluoro-6-isopropoxyindanone, 2-isopropyl-6-benzyloxyindanone and 2-(prop-2-en)-4-methyl-6-phenoxyindanone, respectively.

EXAMPLE 4

2-methyl-6-fluoroindanone (A) Ethyl-4-fluoro-α-methylcinnamate.—Into a dry 1-liter 3-neck round bottom flask equipped with stirring, thermometer and nitrogen inlet tube is charged sodium hydride (0.384 mole). Ethyl propionate (1.45 mole) is added, the temperature kept at ca. 10° C. with a Dry-Ice-acetone bath. Absolute ethanol (0.48 ml.) is then added, followed by a mixture of ethylpropionate (0.78 mole) and p-fluorobenzaldehyde (0.322 mole) added at such a rate that the temperature stays at 15–20° C. The mixture is cooled to 15°, the Dry-Ice-acetone bath replaced by an ice bath, and the mixture stirred one hour. A solution of 29.2 ml. of glacial acetic acid in 108 ml. water is added, the mixture stirred ca. 15 minutes, transferred to a separatory funnel, the layer separated, and the aqueous layer extracted with 2× 54 ml. ether. The ether and organic layers are combined, washed with 2× 36 ml. water and 3× 97 ml. 10% aqueous potassium carbonate solution, dried over anhydrous potassium carbonate, filtered, and the solvent removed in vacuo. Distillation of the oily residue in vacuo gives ethyl-4-fluoro-α-methylcinnamate, B.P. 125–131°; 5–6 mm.

Similarly, the use of o-fluorobenzaldehyde, m-fluorobenzaldehyde and p-trifluoromethylbenzaldehyde in place of p-fluorobenzaldehyde in the above procedure gives ethyl-2-fluoro-α-methylcinnamate, ethyl-3-fluoro-α-methylcinnamate and ethyl-4-trifluoromethyl-α-methylcinnamate, respectively.

(B) 4-fluoro-α-methylcinnamic acid.—To a solution of ethyl-4-fluoro-α-methylcinnamate (0.01 mole) in 25 ml. of ethanol is added a solution of potassium hydroxide (0.01 mole) in 5 ml. of water and the mixture stirred overnight at room temperature under a nitrogen atmosphere. Water (ca. 100 ml.) is added, the aqueous mixture washed with 3× 100 ml. ether, ice-cooled and acidified with 2.5 N hydrochloric acid, and extracted with 3× 100 ml. ethyl acetate. The combined ethyl acetate extracts are washed with 2× 100 ml. water, dried over anhydrous sodium sulfate, filtered, and the solvent removed in vacuo leaving 4-fluoro-α-methylcinnamic acid, M.P. 151–153° C. (from ethanol).

Similarly, using ethyl - 2 - fluoro-α-methylcinnamate, ethyl-3-fluoro-α-methylcinnamate, or ethyl-4-trifluoromethyl-α-methylcinnamate in place of ethyl-4-fluoro-α-methylcinnamate in the above procedure gives 2-fluoro-α-methylcinnamic acid, 3-fluoro-α-methylcinnamic acid and 4-trifluoromethyl-α-methylcinnamic acid, respectively.

(C) 4-fluoro-α-methylhydrocinnamic acid.—A solution of 4-fluoro-α-methylcinnamic acid (0.23 mole) in 800 ml. of anhydrous ethanol is reduced at room temperature under a hydrogen pressure of 40 p.s.i. in the presence of 2 g. 5% palladium on carbon. After filtering, the ethanol is removed in vacuo, several 40 ml. portions of benzene added and distilled away to remove moisture, and the oily residue dried in vacuo leaving 4-fluoro-α-methylhydrocinnamic acid.

Similarly, reduction of 2-fluoro-α-methylcinnamic acid, 3-fluoro-α-methylcinnamic acid, and 4-trifluoromethyl-α-methylcinnamic acid using the above procedure gives the corresponding hydrocinnamic acid derivative.

(D) 2-methyl-6-fluoroindanone. — The procedure of Example 3 is followed using 4-fluoro-α-methylhydrocinnamic acid in place of the methyl methoxyphenyl propionic acid used there, to yield 2-methyl-6-fluoroindanone.

Similarly, 4-fluoro-2-methylindanone, 5-fluoro-2-methylindanone, and 6-trifluoromethyl-2-methylindanone are obtained via the above procedure (followed by chromatography on an acid-washed alumina column [v./v. 1:30] using ether-petroleum ether [v./v. 0–60%] for the 5-fluoro-2-methylindanone) from 2-fluoro-α-methylhydrocinnamic acid, 3-fluoro-α-methylhydrocinnamic acid, and 4-trifluoromethyl-α-methylhydrocinnamic acid, respectively.

EXAMPLE 5

(A) When an equivalent quantity of p-bis (β-hydroxyethyl) aminobenzaldehyde (produced by the reaction of 0.5 mole of p-aminobenzaldehyde, 1.2 mole of ethylene oxide and 0.7 mole of acetic acid in 500 ml. of dimethoxyethane, all heated to 100° C. for 18 hours in an autoclave) is substituted for p-fluorobenzaldehyde in the procedure of Example 4A, the corresponding substituted ester, ethyl 4-bis (β-hydroxyethyl)amino-α-methylcinnamate, is produced.

(B) The product of Part A (0.1 mole) is stirred with 2 moles of p-toluenesulfonyl chloride in pyridine until the reaction is substantially complete. The mixture is poured into water and the 4-bis(p-toluenesulfonyl-oxyethyl)amino compound is isolated, dissolved in benzene and 1 mole of methylamine added. The mixture is allowed to stand at room temperature for three days, then is poured into iced water containing two equivalents of sodium carbonate and extracted with ether. Evaporation of the solvent yields ethyl 4-(4'-methyl-1'-piperazinyl)-α-methylcinnamate.

(C) A solution of 0.1 mole of ethyl 4-bis(β-hydroxyethyl)amino-α-methylcinnamate and 0.3 mole of pyridine in 300 ml. of benzene has added to it, dropwise, 0.1 mole of p-tosyl chloride in 200 ml. of benzene, with stirring. After the addition is complete (one hour), the mixture is heated under reflux for three hours, washed with water, dried over sodium sulfate and evaporated to produce ethyl 4-(4'-morpholinyl)-α-methylcinnamate.

(D) By substituting the products obtained in Parts A, B and C of this example in the procedures delineated in Parts B, C and D of Example 4, corresponding compounds are produced, the indanones being 2-methyl-6-bis(β-hydroxyethyl)aminoindanone, 2-methyl-6-(4'-methyl-1'-piperazinyl)indanone and 2-methyl-6-(4'-morpholinyl) indanone, respectively.

EXAMPLE 6

(A) 2-methyl-5-methoxyindene (1) To a mixture of 7.56 g. of sodium borohydride and 200 ml. of isopropanol is added dropwise a solution of 0.2 mole of 2-methyl-6-methoxyindanone in 50 ml. isopropanol at room temperature over a period of one-half hour. The mixture is then heated at the reflux temperature for 4–8 hours, the reduction being followed by thin-layer chromatography. After cooling, the mixture is poured into one liter of ice water and extracted with 3× 150 ml. of ether. The ethereal solution is washed with water, dried over sodium sulfate, and evaporated to give crude 2-methyl-6-methoxy-1-indanol.

(2) The above indanol (0.05 mole) is dissolved in a mixture of 25 ml. ether and 4.4 g. (0.055 mole) of pyridine. The solution is cooled to 0° and to this is added slowly 5.8 g. (0.05 mole) of methyl chlorosulfinate over a period of 20–25 minutes. After stirring at 0–5° for an additional 30–60 minutes the mixture is poured into iced-water and extracted with ether. The ethereal solution is washed with .2 N hydrochloric acid, sodium bicarbonate, water and dried over sodium sulfate. The dried solution is evaporated to a residue. Pyrolysis of the residue under nitrogen with concomitant distillation at bath temperature (100–310°) under partial vacuum gives 2-methyl-5-methoxyindene as a yellow liquid.

(B)

When 2-thienyl-6-methoxyindanone (prepared by the Claisen condensation of anisaldehyde on ethyl thienyl-2 acetate, followed by catalytic reduction over palladium and ring closure with polyphosphoric acid) is used in the above procedure in place of 2-methyl-6-methoxyindanone, the corresponding indene, 2-thienyl-5-methoxyindene, is produced.

Similarly, the use in the procedure of Part A of any of the indanones prepared in the preceding examples will produce the corresponding indenes, for example: 2-methoxy-7-methylindene; 2-methyl-5-fluoroindene; 2-benzyl-5-methylindene; 2,4-dimethyl-7-isopropylindene; and 4,5-benzoindene.

EXAMPLE 7

β-(2-methyl-5-methoxy-3-indenyl)nitroethane

A total of 0.3 mole of 2-methyl-5-methoxyindene, 0.33 mole of nitroethylene and 10 ml. of tert. potassium butoxide are mixed with 100 ml. of dimethoxyethane. The mixture is maintained at 10° C. for six hours, with stirring, and then extracted with ether. The ether is evaporated in vacuo to produce β-(2-methyl-5-methoxy-3-indenyl) nitroethane.

In a similar manner, when any other indene is substituted in the procedure of this example, the corresponding β-nitroethane is produced, for example, β-(2-carboxy-3-indenyl)nitroethane. If a substituted nitroethylene, such as 1-nitro-2-methylbutene-1 or 1-nitropropene-1 is used, the corresponding α- or β-substituted nitroethane compound is obtained. Thus, when 2-methyl-5-methoxyindene is reacted with the substituted nitroethylene compounds given above, the products are β-(2-methyl-5-methoxy-3-indenyl)-α-methylnitrobutane and β-(2-methyl-5-methoxy-3-indenyl)nitropropane.

EXAMPLE 8.—γ-(2-METHYL-5-METHOXY-3-INDENYL) PROPYLAMINE (A) β-(2-methyl-5-methoxy-3-indenyl)ethyl alcohol (1) 2-methyl-5-methoxy-3-indenyl ethanal.—0.05 mole of β-(2-methyl-5-methoxy-3-indenyl)nitroethane is shaken, for 15 minutes, with 20 ml. of a 10% alcoholic sodium hydroxide solution. 80% sulfuric acid (10 ml.) is then carefully added and the mixture is heated to 80° C. for 30 minutes, cooled and extracted with ether. The ether solvent is evaporated in vacuo to yield 2-methyl-5-methoxy-3-indenyl ethanal.

(2) β-(2-methyl-5-methoxy-3-indenyl)ethyl alcohol.—To a mixture of 1.9 g. of sodium borohydride and 50 ml. of isopropanol is added, dropwise, a solution of the above indenyl aldehyde in 50 ml. of isopropanol at room temperature over a half-hour period. The mixture is then heated at reflux for six hours, cooled, poured into 200 ml. of iced water and extracted with ether. The ethereal solution is washed with water, dried over sodium sulfate and evaporated to give β-(2-methyl-5-methoxy-3-indenyl)ethyl alcohol.

(B) β-(2-methyl-5-methoxy-3-indenyl)ethylcyanide (1) To a solution of 0.03 mole of β-(2-methyl-5-methoxy-3-indenyl)ethyl alcohol in 100 ml. of pyridine, is added 0.033 mole of p-tosyl chloride. The mixture is warmed gently for one hour, poured into water and the solid which precipitates is collected, dissolved in methylene chloride, washed with dilute sodium bicarbonate, then water, dried and evaporated in vacuo to produce the p-tosyl ester of the starting alcohol.

(2) The ester produced above is dissolved in 100 ml. of dimethylsulfoxide containing 0.06 mole of potassium cyanide. The mixture is warmed gently for six hours on a steam bath, cooled and poured into iced water. The product is extracted with ether, washed with water, dried and evaporated in vacuo to a syrup. The residue is chromatographed on a column of acid-washed alumina to produce β-(2-methyl-5-methoxy-3-indenyl)ethylcyanide.

(C) γ-(2-methyl-5-methoxy-3-indenyl)propylamine

To a mixture of 1.95 g. of lithium aluminum hydride and 30 ml. of isopropanol is added a solution of β-(2-methyl-5-methoxy-3-indenyl)ethylcyanide in 30 ml. of isopropanol at room temperature. The mixture is heated at reflux for eight hours, cooled and poured into iced water, then extracted with ether. The ethereal extract is evaporated in vacuo to produce γ-(2-methyl-5-methoxy-3-indenyl)propylamine.

(D)

When indenyl α- or β-substituted nitroethane compounds are substituted in the procedure of this example in place of β-(2-methyl-5-methoxy-3-indenyl)nitroethane, the corresponding β- and γ substituted propylamines are obtained. Thus when β-(2,4-dimethyl-6-isopropyl-3-indenyl)-α-methylnitrobutane and β-(2-benzyl-5-methyl-3-indenyl)-α-ethyl-β-(t-butyl)nitroethane are substituted in the above procedure, γ-(2,4-dimethyl-6-isopropyl-3-indenyl)-β-methylpentylamine and γ-(2-benzyl-5-methyl-3-indenyl)-γ-(t-butyl) propylamine are produced, respectively.

EXAMPLE 9

β-(2-methyl-5-methoxy-3-indenyl)ethylamine

A total of 0.2 mole of β-(2-methyl-5-methoxy-3-indenyl)nitroethane, dissolved in 100 ml. of ethanol, is hydrogenated in the presence of 0.4 g. of a 10% palladium-on-charcoal catalyst, at room temperature and a pressure of 40 p.s.i. After the theoretical amount of hydrogen has been consumed, the reaction is stopped and the solution filtered to remove the catalyst. The filtrate is concentrated to dryness in vacuo to yield β-(2-methyl-5-methoxy-3-indenyl)ethylamine.

Similarly, any other β-nitroalkane prepared by the process of Example 7 may be reduced to the corresponding β-ethylamine by the procedure described above, for example:

β-(2-methoxy-7-methyl-3-indenyl)ethylamine
β-(2-fluoro-5-benzyloxy-3-indenyl)ethylamine
β-(2-phenyl-5-methylthio-3-indenyl)ethylamine
β-[2-(n-butyl)-cyclohexyl-3-indenyl]ethylamine

EXAMPLE 10

β-(1-benzylidenyl-2-methyl-5-methoxy-3-indenyl)ethylamine hydrochloride

To a solution of 0.002 mole of β-(2-methyl-5-methoxy-3-indenyl)ethylamine and 0.0042 mole of benzaldehyde in 15 ml. of dimethoxyethane is added 1.63 g. of a 40% alcoholic solution of trimethylbenzyl ammonium hydroxide. The reaction mixture is stirred at 0° C. for hours, then overnight at room temperature. The mixture is then poured into an ice-water mixture, acidified with 2.5 N hydrochloric acid stirred and washed with ether. The water layer is then concentrated in vacuo to produce β-(1-benzylidenyl - 2 - methyl - 5 - methoxy - 3 - indenyl)ethylamine hydrochloride.

In a similar manner, when any indenyl-β-(ethyl or propyl) amine prepared by the methods disclosed heretofore is substituted in the above reaction, the corresponding 1-substituted indenylamine is produced, namely:

β-(1-benzylidenyl-2-fluoro-5-benzyloxy-3-indenyl) ethylamine hydrochloride;
γ-(1-benzylidenyl-2-phenyl-7-methyl-3-indenyl) propylamine hydrochloride;
β-(1-benzylidenyl-2-methoxy-5-chloro-3-indenyl)-α-methylpropylamine hydrochloride;
β-(1-benzylidenyl-2-carboxy-3-indenyl)propylamine hydrochloride.

EXAMPLE 11

The procedure of Example 10 is followed using the following carbonyl compounds in place of benzaldehyde, to produce the corresponding 1-alkylidene derivatives of the 3-indenyl ethyl-amino compounds and derivatives prepared heretofore:

p-nitrobenzaldehyde
p-chlorobenzaldehyde
p-methylthiobenzaldehyde
m-trifluoromethylbenzaldehyde
p-trifluoromethylbenzaldehyde
p-bromobenzaldehyde
p-methoxybenzaldehyde
3,4-dichlorobenzaldehyde
2,4-dichlorobenzaldehyde
3-nitrothiophene-2-carboxaldehyde
2-thiophenecarboxaldehyde
2-furaldehyde
N-methylpyrrolo-2-aldehyde
thiazone-2-carboxaldehyde
pyridine-2-aldehyde
pyridine-3-aldehyde
pyridine-4-aldehyde
1-methylimidazole-5-aldehyde
1-methyl-indole-3-carboxaldehyde
N-methylpiperidine-4-carboxaldehyde
quinoxaline-2-carboxaldehyde
5-chloro-3-benzofuranecarboxaldehyde
5-benzofurancarboxaldehyde
3-thianaphthenecarboxaldehyde
1-methylbenzimidazole-3-carboxaldehyde
4H-1,3-methyl-4-oxo-2-benzofurancarboxaldehyde
2-phenyl-2,5-dihydro-3-pyridazinecarboxaldehyde
3-quinolinecarboxaldehyde
4-quinolinecarboxaldehyde
5-quinolinecarboxaldehyde
6-quinolinecarboxaldehyde
7-quinolinecarboxaldehyde
8-quinolinecarboxaldehyde
2-ethoxytetrahydropyran-3-carboxaldehyde
4-oxazolecarboxaldehyde
5-ethoxy-4-styryl-2-oxazolecarboxaldehyde
4-isoquinolinecarboxaldehyde
7-azaindole-3-carboxaldehyde
1,7-naphthyridine-2-carboxaldehyde
4-methyl-4-penten-2-one
1,1-dichloro-2-propanone
2-chloroacetylfuran
2-acetylpyrrole
cyclohexan-1-one
cyclobutylmethyl ketone
4-bromobenzophenone
bis(5-mehyl-2-thienyl)ketone
1-naphthylmethyl ketone
4,4,4-trichloro-1-(2-thienyl)-2-buten-1-one
1-(5-quinolyl)-1-pentanone
1-(2-furyl)-1-butanone

EXAMPLE 12

(1-benzylidenyl-2-methyl-5-methoxy-3-indenyl) methylamine (A) Ethyl - 2-methyl-5-methoxy-3-indenyl acetate.—A solution of 0.1 mole of 2-methyl-6-methoxyindanone and 0.15 mole of ethyl bromoacetate in 45 ml. benzene is added over a period of 5 minutes to 21 g. of zinc amalgam (prepared according to Org. Syn. Coll. vol. 3) in 110 ml. benzene and 40 ml. dry ether. A few crystals of iodine are added to start the reaction, and the reaction mixture is maintained at reflux temperature (ca. 65°) with external heating. At 3 hour intervals two batches of 10 g. zinc amalgam and 10 g. bromoester are added and the mixture is then refluxed for 8 hours. After addition of 30 ml. of ethanol and 150 ml. of acetic acid, the mixture is poured into 700 ml. of 1:1 aqueous acetic acid. The organic layer is separated, and the aqueous layer is extracted twice with ether. The combined organic layers are washed thoroughly with water, ammonium hydroxide and water. Drying over sodium sulfate, evaporation of solvent in vacuo followed by pumping at 80° (bath temp.) (1–2 mm.) gives a crude ethyl-(1-hydroxy-2-methyl-6-methoxy-indenyl)acetate.

A mixture of the above crude hydroxyester, 20 g. of p-toluenesulfonic acid monohydrate and 20 g. of anhydrous calcium chloride in 250 ml. toluene is refluxed overnight. The solution is filtered and the solid residue is washed with benzene. The combined benzene solution is washed with water, sodium-bicarbonate, water and then dried over sodium sulfate. After evaporation, the crude ethyl-5-methoxy-2-methyl-3-indenyl acetate is chromatographed on acid-washed alumina and the product is eluted with petroleum ether-ether (v./v. 50–100%) as a yellow oil.

(B) 1-benzylidenyl-2-methyl-5-methoxy - 3 - indenyl acetic acid.—To a solution of 0.02 mole of the ester prepared in Part A in 10 ml. of dry dimethoxyethane is added 0.021 mole of benzaldehyde, followed by 0.64 g. of potassium tert-butoxide, with ice-cooling and stirring. The mixture is stirred at 0° C. overnight. The precipitate which has separated is removed and washed with 3 ml. of dimethoxyethane dissolved in a small amount of hot water and acidified with dilute hydrochloric acid. The precipitate which forms is filtered and dried in vacuo, then dissolved in 10 ml. of methanol with gentle warming. On cooling, the precipitate which forms, 1-benzylidenyl-2-methyl-5-methoxy-3-idenyl acetic acid, is isolated by filtration.

When the compounds listed in Example 11 are substituted for benzaldehyde in the above procedure, the corresponding 1-substituted -3-indenyl acids are produced.

(C) 1 - benzylidenyl - 2-methyl-5-methoxy-3-indenyl acetamide.—A mixture of 1-benzylidenyl-2-methyl-5-methoxy - 3 - indenyl acetic acid (0.01 mole) and 0.03 mole of thionyl chloride is heated on a steam bath, care being taken to exclude water. When gas evolution ceases, excess thionyl chloride is removed in vacuo and the residue taken up in a slight excess of anhydrous ether and added slowly to an ice-cooled solution of concentrated aqueous ammonium hydroxide. The reaction mixture is stirred overnight at room temperature and filtered and the precipitate washed with ether. The ether is moved in vacuo to produce 1-benzylidenyl-2-methyl-5-methoxy-3-indenyl acetamide.

(D) (1-benzylidenyl-2-methyl-5-methoxy-3 - indenyl) methylamine.—A solution of 0.2 mole of freshly prepared sodium hydrochlorite in 100 ml. of water is added to the product of Part C (0.05 mole) in 20 ml. of water and the mixture is added to 0.25 mole of sodium hydroxide in 25 ml. of water. The temperature is raised to 75° C. for one hour and then the amine is driven over in steam to produce 1 - benzylidenyl-2-methyl-5-methoxy-3-indenyl) methylamine.

(E) By reacting any appropriately substituted indanone according to the procedures of this example, the corresponding α-(1-alkylidene-3-indenyl)alkylamine can be prepared, for example:

β-(1-phenylmethylmethylidenyl-2-methyl-5-methoxy-3-indenyl)propylamine;
α - [1 - (p-methoxybenzylidenyl)-2-(p-methoxyphenyl)-4-trifluoromethyl-5-methyl-3-indenyl]propylamine;
α-[1-(pyridinylidenyl-4)-2-methyl-5-methoxy-3-indenyl]ethylamine.

EXAMPLE 13

β-(1-benzylidenyl-2-methylthio-5-methoxy-3-indenyl)-ethylamine hydrochloride

A solution of 0.1 mole of 2-bromo-6-methoxy-indanone (0.1 mole) in 150 ml. of dry methanol is slowly added, in a nitrogen atmosphere, to a solution of sodium thiomethoxide (prepared from 2.5 g. of sodium metal and 100 ml. of dry methanol containing 0.1 mole of methylmercaptan). The solution is refluxed for one hour, concentrated in vacuo, poured into water and then extracted with ether. The ethereal solution is washed with water and dried over sodium sulfate. Evaporation of the solvent followed by chromatography on 300 g. of acid-washed alumina, using ether-n-hexane (v./v. 10–50%) as eluent, gives 2-methylthio-6-methoxy-indanone.

Using the procedures of Examples 6, 7, 9 and 10, the above indanone is converted successively to 2-methylthio-5 - methoxyindene and β - (1-benzylidenyl-2-methylthio-5-methoxy-3-indenyl)ethylamine hydrochloride.

In a similar manner, any other 1-alkylidenyl-2-aryl or alkylmercapto-3-indenyl alkylamine may be prepared by using the appropriate starting compounds and reagents, for example:

α - [1 - (2,4-dichlorobenzylidenyl)-2-phenylthio-7-methyl-3-indenyl]ethylamine hydrochloride;
β - [1 - (p - chlorobenzylidenyl)-2-methylthio-4-phenyl-3-indenyl]-α-ethylbutylamine hydrochloride;
β - [1 - (p - methoxybenzilidenyl)-2-benzylthio-4-fluoro-5-isopropoxy - 3-indenyl]-β-ethylpropylamine hydrochloride;
γ - [1 - (m - trifluoromethylbenzylidenyl)-2-isopropylthio-5 - azacyclopropyl - 3-indenyl]-β-hydroxymethylpropylamine hydrochloride.

EXAMPLE 14

(A) β-(1-benzylidenyl-2-bromo-3-indenyl)ethylamine hydrochloride

A total of 0.01 mole of β-(1-benzylidenyl-2-carboxy-3-indenyl)ethylamine hydrochloride and 100 ml. of a 10% solution of sodium hydroxide are stirred together at 25° C. for one hour, then 0.05 mole of silver nitrate in 100 ml. of water is slowly added with continuous stirring. After the addition is complete, the precipitated product is filtered, washed twice with 50 ml. portions of cold water and dried in vacuo.

This silver salt is then dissolved in 100 ml. of ether and 0.02 mole of bromine is slowly added, stirring continuously. After the addition is complete, the reaction mixture is stirred for one hour, filtered and evaporated in vacuo to obtain β - (1 - benzylidenyl-2-bromo-3-indenyl)ethylamine hydrochloride.

(B)

By utilizing an equivalent amount of chlorine (bubbled through the solution) the 2-chloro compound of the invention is prepared.

EXAMPLE 15

β-(1-benzylidenyl-5-phenyl-3-indenyl)ethylamine hydrochloride

The procedure of Example 4C is followed, using p-phenylcinnamic acid in place of the substituted cinnamic used therein. The resulting hydrocinnamic acid is used in the procedure of Example 3 to form 6-phenylindanone which is then treated according to the procedure of Example 6 to produce 5-phenylindene. When the procedures of Examples 7, 9 and 10 are utilized on that indene, β-(1-benzylindenyl - 5 - phenyl-3-indenyl)ethylamine hydrochloride is produced.

In the same manner, by using the appropriately substituted aryl cinnamic acid in the above procedure to form an indenyl alkyl amine and reacting the latter with a compound of Example 11, a 1-alkylidene-4,5,6,7-aryl substituted-3-indenyl alkylamine is produced.

EXAMPLE 16

(A) β-(1-benzylidenyl-2-methyl-5-methoxy-3-indenyl)-N-ethyl aminoethane

A mixture of 0.01 mole of β-(1-benzylidenyl-2-methyl-5 - methoxy - 3 - indenyl)ethylamine hydrochloride, 0.011 mole of ethyl iodide and 0.025 mole of sodium bicarbonate in 50 ml. of anhydrous 1,2-dimethoxyethane is stirred at room temperature under nitrogen for 8 hours. The mixture is then filtered and the solvent removed in vacuo. The residue is chromatographed on neutral alumina to give β - (1 - benzylidenyl - 2 - methyl-5-methoxy-3-indenyl)-N-ethyl aminoethane.

(B) β-(1-benzylidenyl-2-methyl-5-methoxy-3-indenyl)-N,N-diethylaminoethane

Ethyl iodide (0.022 mole), 0.025 mole of sodium bicarbonate and 0.01 mole of β-(1-benzylidenyl-2-methyl-5-methoxy-3-indenyl)ethylamine hydrochloride are stirred together in 50 ml. of anhydrous 1-2-dimethoxyethane at room temperature under nitrogen for eight hours. The mixture is filtered and the solvent removed in vacuo. The crude product is chromatographed on neutral alumina to produce β - (1 - benzylidenyl-2-methyl-5-methoxy-3-indenyl)-N,N-diethylaminoethane.

In like manner, when p-methoxybenzyl chloride, benzyloxyiodide, β-methoxyethyl iodide, allyl bromide, p-methoxyphenylpropyl iodide, ethyl chloride, cyclopropyl methyl bromide, cyclobutylmethyl bromide, tetrahydrofurfuryl bromide, cyclohexyl iodide, 1,5-diiodopentane, dibromodiethylether, di(β-chloroethyl)-methylamine hydrochloride, di-(β-chloroethyl)amine hydrochloride, di(β-chloro)-aniline hydrochloride, 1,4-dichlorobutane and di(β-chloroethyl)-β-hydroxyethylamine hydrochloride are used in the place of ethyl iodide in the procedures of this example, the corresponding β-(1-benzylidenyl-2-methyl-5-methoxy-3-indenyl) substituted aminoethane compounds are produced.

Similarly, any other 1-alkylidene-3-indenyl alkylamine may be substituted in the above procedure in place of β-(1-benzylidenyl-2-methyl-5-methoxy-3-indenyl)ethylamine hydrochloride and reacted with a suitable reagent to produce a monosubstituted or disubstituted indenyl amine, for example:

β-[1-(p-trifluoromethylbenzylidenyl)-2-methyl-5-methoxy-3-indenyl]-N-methylaminopropane;
β-[1-(2-thienylidenyl-3)-2-fluoro-6-phenyl-3-indenyl]-α-methyl-N,N-diisopropyl aminoethane;
α-[1-(p-chlorobenzylidenyl)-2-(p-methoxyphenyl)-5-fluoro-3-indenyl]-N-propylaminopropane.

EXAMPLE 17

β-(1-benzylidenyl-2-methyl-5-allyloxy-3-indenyl) ethylamine hydrochloride (A) β - (1 - benzylidenyl - 2 - methyl-5-hydroxy-3-indenyl)ethylamine hydrochloride.—A solution of β-(1-benzylidenyl - 2 - methyl - 5 - benzyloxy-3-indenyl)ethylamine hydrochloride (0.02 mole) in 60 ml. of methanol is hydrogenated at room temperature in the presence of a 10% palladium-on charcoal catalyst under 40 p.s.i. pressure. After the theoretical amount of hydrogen has been absorbed, the reaction mixture is filtered, concentrated in vacuo and redissolved in ether. The latter solution is treated with anhydrous hydrogen chloride to produce β - (1 - benzylidenyl - 2 - methyl-5-hydroxy-3-indenyl)ethylamine hydrochloride.

(B) β - (1 - benzylidenyl - 2 - methyl-5-allyloxy-3-indenyl)ethylamine hydrochloride.—A mixture of 0.1 mole of β - (1 - benzylidenyl - 2 - methyl - 5 - hydroxy-3-indenyl)ethylamine hydrochloride, 500 ml. of acetone, 0.2 mole of potassium carbonate and 0.15 mole of allyl chloride is refluxed overnight. The mixture is then drowned in a large amount of water and, after acidification, extracted with ethanol. The ethanol extract is dried and evaporated to yield the 5-allyloxy compound.

When cyclopentyl bromide is used in place of the allyl halide, the corresponding 5-cyclopentyloxy compound is compound.

EXAMPLE 18

β-(1-benzylidenyl-2-methyl-5-vinyl-3-indenyl)ethylamine hydrochloride (A) β - (1 - benzylidenyl - 2-methyl-5-dimethylaminoethyl - 3 - indenyl)ethylamine hydrochloride.—When 2-methyl-6-dimethylaminoethyl-indanone is reacted according to the procedures of Examples 6, 7, 9 and 10 in succession, the product obtained is β-(1-benzylidenyl-2-methyl - 5 - dimethylaminoethyl - 3 - indenyl)ethylamine hydrochloride.

(B) β - (1 - benzylidenyl - 2 - methyl - 5-vinyl-3-indenyl)ethylamine hydrochloride.—A mixture of the product of Part A, a molar excess of methyl iodide and 50 ml. of ethanol is heated until quaternization is complete. Evaporation to dryness in vacuo yields a residue consisting of the 5-trimethyl-ammonium ethyl iodide salt of the starting compounds. This salt is dissolved in 2 N sodium hydroxide and the mixture is heated for four hours on a steam bath, then cooled and extracted with ether. The ether solution is dried and treated with anhydrous hydrogen chloride. The precipitated product, β-(1-benzylidenyl - 2-methyl-5-vinyl-3-indenyl)ethylamine hydrochloride, is filtered and dried.

What is claimed is:
1. A compound of the formula

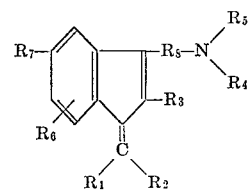

wherein:
$R_1$ and $R_2$ are each hydrogen, lower alkyl, phenyl, lower alkyl thio, halo lower alkyl, cyclopentyl, cyclohexyl, nitro, halo, lower alkyl, trifluoromethyl or lower alkoxy substituted phenyl;
$R_3$ is hydrogen, bromo, fluoro, chloro, hydroxy, lower alkyl, lower alkylthio, lower alkenyl, phenyl, chlormethyl, lower alkoxyphenyl, trifluoromethyl, thienyl or benzyl, or lower alkoxy;
$R_4$ and $R_5$ are each hydrogen, lower alkyl, lower alkoxy lower alkyl, hydroxy lower alkyl, lower alkenyl, lower alkynyl, cyclopropyl lower alkyl, cyclobutyl lower alkyl or cyclic lower alkyl;
$R_6$ is hydrogen, chloro, fluoro, lower alkyl, lower alkoxy, lower alkylthio, phenyl, phenoxy, or trifluoromethyl.
$R_7$ is hydrogen, hydroxy, lower alkyl, lower alkoxy, nitro, amino, lower alkylamino, di(lower alkyl) amino, lower alkanoylamino, lower alkanoyl, bis (hydroxy lower alkyl)amino, cyano, trifluoromethyl, fluoro, chloro, bromo, di(lower alkyl) sulfamyl, benzylthio, benzyloxy, lower alkylbenzyloxy, lower alkoxybenzyloxy, chlorobenzyloxy, lower alkenyl, lower alkenyloxy, cyclopropyl, lower alkoxy or cyclobutyl lower alkoxy.
$R_8$ is

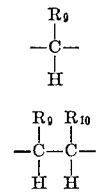

or

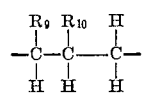

in which:
$R_9$ and $R_{10}$ are each hydrogen, lower alkyl, fluoro lower alkyl, benzyloxy lower alkyl, hydroxy lower alkyl, lower alkenyl, phenyl or lower alkynyl, or their acid addition salts.
2. β - [1 - (p - chlorobenzylidenyl) - 2-methyl-5-methoxy-3-indenyl] ethylamine hydrochloride.
3. α - [1 - (p - methylthiobenzylidenyl)-2-methyl-5-fluoro-3-indenyl] ethylamine hydrochloride.
4. γ - [1 - (p - methoxybenzylidenyl) - 2 - methyl-5-methoxy-3-indenyl] propylamine hydrochloride.
5. β - [1 - (p - trifluoromethylbenzylidenyl)-2-methyl-5-methoxy - 3 - indenyl] - N-methylaminopropane hydrochloride.
6. β - [1 - (phenylmethylmethylidenyl) -2 -methyl-5-methoxy-3-indenyl] propylamine hydrochloride.

(References on following page)

References Cited

UNITED STATES PATENTS

| | | | |
|---|---|---|---|
| 2,798,888 | 7/1957 | Ueberwasser | 260—570.8 |
| 2,886,589 | 5/1959 | Novello | 260—590 XR |
| 3,072,716 | 1/1963 | Huebner | 260—570.8 XR |
| 3,164,607 | 1/1965 | Lednicer | 260—590 XR |
| 3,328,411 | 6/1967 | Borck et al. | 260—590 XR |

FOREIGN PATENTS 959,704  6/1964  Great Britain.

OTHER REFERENCES

Houben-Weyl, "Methoden der Organischen Chemie," vol. 8, pp. 306–308 (1952).

Noland et al., J. Am. Chem. Soc., vol. 77, pp. 456 and 457 (1955).

Wagner et al., "Synthetic Organic Chemistry," pp. 149–152, 246, 267, 658–661, 728, 729 and 823 (1953).

FLOYD D. HIGEL, Primary Examiner

U.S. Cl. X.R.

260—247.5, 268, 288, 293, 294.7, 326.15, 329, 332.3, 332.5, 340.9, 346.2, 347.7, 347.8, 453, 456, 465, 469, 470, 473, 476, 490, 501.1, 501.18, 515, 521, 556, 558, 559, 590, 600, 607, 612, 613, 618, 621, 645, 668; 424—330